United States Patent
Son et al.

(10) Patent No.: US 11,150,490 B2
(45) Date of Patent: Oct. 19, 2021

(54) DISTANCE VISION-REALIZING EYEGLASSES FOR IMAGE DISPLAY DEVICE

(71) Applicant: ZENTRAL CO., LTD., Daejeon (KR)

(72) Inventors: Youngbum Son, Jeonju-si (KR); Jinsuh Kim, Jeonju-si (KR)

(73) Assignee: Yong Chul Park, Incheon (KR)

( * ) Notice: Subject to any disclaimer, the term of this patent is extended or adjusted under 35 U.S.C. 154(b) by 244 days.

(21) Appl. No.: 16/487,562

(22) PCT Filed: Feb. 7, 2018

(86) PCT No.: PCT/KR2018/001643
§ 371 (c)(1),
(2) Date: Aug. 21, 2019

(87) PCT Pub. No.: WO2018/155849
PCT Pub. Date: Aug. 30, 2018

(65) Prior Publication Data
US 2019/0384071 A1     Dec. 19, 2019

(30) Foreign Application Priority Data
Feb. 21, 2017    (KR) .......................... 10-2017-0022925

(51) Int. Cl.
*G02C 5/00* (2006.01)
*G02C 7/06* (2006.01)

(52) U.S. Cl.
CPC ............... *G02C 5/001* (2013.01); *G02C 7/06* (2013.01); *G02C 2202/08* (2013.01)

(58) Field of Classification Search
CPC ...... G02C 5/001; G02C 7/06; G02C 2202/08; G02C 7/088; G02C 11/12; G02B 7/10;
(Continued)

(56) References Cited

U.S. PATENT DOCUMENTS

| 4,097,141 | A | * | 6/1978 | Warner | ................ | G02B 17/045 |
| | | | | | | 359/364 |
| 7,283,300 | B2 | * | 10/2007 | Jojiki | ..................... | G02B 7/002 |
| | | | | | | 351/158 |

(Continued)

FOREIGN PATENT DOCUMENTS

| JP | H08-160344 A | 6/1996 |
| JP | 2000-111804 A | 4/2000 |

(Continued)

OTHER PUBLICATIONS

International Search Report for PCT/KR2018/001643 dated May 30, 2018 from Korean Intellectual Property Office.
(Continued)

*Primary Examiner* — Tuyen Tra
(74) *Attorney, Agent, or Firm* — Paratus Law Group, PLLC (57) ABSTRACT

Disclosed is a distance vision-realizing eyeglasses for an image display device, including: a case which surrounds an eye area of a wearer and has a pair of holes formed in front thereof; a double convex lens assembly which includes a pair of lens housings respectively mounted in the pair of holes of the case and a pair of double convex lenses respectively provided in the pair of lens housings on a front straight line of both eyes of the wearer, the pair of the double convex lenses including an outer convex lens positioned on an outer side and fixed to the lens housing and an inner convex lens positioned inside the lens housing and mounted movably forward and backward; and a driving part which is installed between the pair of lens housings and moves a pair of inner convex lenses of the double convex lens assembly.

12 Claims, 5 Drawing Sheets

(58) Field of Classification Search
CPC .......... G02B 7/023; G02B 7/02; G02B 7/105; G02B 7/021; G03B 3/12
See application file for complete search history.

(56) References Cited

U.S. PATENT DOCUMENTS

| | | | |
|---|---|---|---|
| 8,446,670 B2* | 5/2013 | Woker | G02B 25/004 359/419 |
| 9,658,460 B2* | 5/2017 | Lee | G02B 27/0179 |
| 10,247,965 B2* | 4/2019 | Ton | A61B 90/50 |
| 2012/0147038 A1 | 6/2012 | Perez et al. | |

FOREIGN PATENT DOCUMENTS

| | | |
|---|---|---|
| JP | 2009-031381 A | 2/2009 |
| JP | 2014-228716 A | 12/2014 |
| KR | 10-1598110 B1 | 3/2016 |
| KR | 10-1635892 B1 | 7/2016 |

OTHER PUBLICATIONS

Korean Office Action for related KR Application No. 10-2017-0022925 dated Aug. 21, 2018 from Korean Intellectual Property Office.

* cited by examiner

DISTANCE VISION-REALIZING EYEGLASSES FOR IMAGE DISPLAY DEVICE

CROSS-REFERENCE TO PRIOR APPLICATIONS

This application is a National Stage Patent Application of PCT International Patent Application No. PCT/KR2018/001643 (filed on Feb. 7, 2018), which claims priority to Korean Patent Application No. 10-2017-0022925 (filed on Feb. 21, 2017), which are all hereby incorporated by reference in their entirety.

BACKGROUND

The present invention relates to eyeglasses for an image display device, and more specifically, to a distance vision-realizing eyeglasses for an image display device which assists in reliving eye fatigue by enabling realization of distance vision by using double convex lenses.

As the use of personal computer and smartphones is increasing, interest in visual display terminal (VDT) syndrome is growing. VDT syndrome refers to a health disorder including eye symptoms (eye strain, medial strabismus, etc.), musculoskeletal symptoms (shoulder pain, back pain, etc.), and psychological symptoms (anxiety, neurosis, insomnia, etc.), which are caused by long hours of using a computer as mobile devices and computers are proliferated and the Internet has become popular. The seriousness of this syndrome has led to legislation of the VDT work regulations in the U.S., establishment of the VDT task force under the government in Japan, and establishment of Industrial Accident Compensation Insurance Act by the Korean Ministry of Labor, which adds VDT syndrome to occupational accidents for which a temporary incapacity benefit and an accidental compensation can be paid.

According to the Korean Health Insurance Review and Assessment Service, the number of patients with VDT syndrome in 2014 totaled 9.67 million. In other words, one in 3 to 4 Koreans has VDT syndrome. The smartphone user penetration rate in Korea is 83%, the average daily hours of smartphone use is over 3 hours and 30 minutes, and many have medial strabismus symptoms of VDT syndrome.

Korean Patent Registration No. 10-1598110 titled "Goggles for Image Display Having Specific Structure Newton Lens" is disclosed as technology for improving eye symptoms (eye fatigue, medial strabismus, etc.) of the VDT syndrome. Effects of the prior art can be confirmed in an experiment for improving VDT syndrome. The goggles equipped with a Newtonian lens for image display adopts a single lens scheme in which a pair of Newtonian lenses disposed in front of the eyes move back and forth to enable realization of distance vision.

However, the googles equipped with a Newtonian lens for image display has the following drawbacks. First, distance vision is implemented by adopting a single-lens method, and hence there is a limitation in increasing distance vision effect with the single Newtonian lens. In addition, the googles have a structure that enables a pair of Newtonian lenses to move back and forth, and hence impurities or dust may be caught in the eye and a lens movement operating part. Next, in order to move the pair of Newtonian lenses forward and backward, there is a structural disadvantage in that not only the Newtonian lens but also a lens housing surrounding the Newtonian lens has to be simultaneously moved. As a result, the center of gravity of the googles for image display is greatly changed according to the movement of the Newtonian lens, and thus the sensation of wearing goggles for image display may be deteriorated. Also, a large amount of a force of a motor, which is a power source, is required to simultaneously move the housing surrounding the Newtonian lens and vibration and noise may be generated by friction.

Accordingly, an objective of the present invention is to provide distance vision-realizing eyeglasses for an image display device which assist in relieving eye fatigue by enabling realization of distance vision by using double lenses.

Another objective of the present invention is to provide distance vision-realizing eyeglasses for an image display device which are capable of minimizing the shift of the center of gravity caused by forward and backward movement of a lens.

Still another objective of the present invention is to provide distance vision-realizing eyeglasses for an image display device which allow lenses to stably move back and forth.

To achieve the above-described objectives, the present invention provides distance vision-realizing eyeglasses for an image display device including a case, a double convex lens assembly, and a driving part. The case surrounds an eye area of a wearer and includes a pair of lens housing mounting holes formed in front thereof. The double convex lens assembly includes a pair of lens housings and a pair of double convex lenses. The pair of lens housings are respectively mounted in the pair of lens housing mounting holes of the case. The pair of double convex lenses are respectively provided in the pair of lens housings on a front straight line of both eyes of the wearer. Among the pair of the double convex lenses, an outer convex lens positioned on an outer side is fixed to the lens housing and an inner convex lens positioned inside the lens housing is mounted movably forward and backward, thereby enabling realization of distance vision. In addition, the driving part is installed between the pair of lens housings and moves a pair of inner convex lenses of the double convex lens assembly.

Each of the pair of lens housings may include an outer housing body which has a tubular shape and includes a guide slot formed on a side facing the other lens housing, along a movement direction of the inner convex lens and an outer cap which fixes the outer convex lens position on a front surface of the outer housing body to the outer housing body.

The guide slot may be formed on a center line that connects centers of a pair of outer housing bodies.

The double convex lens assembly may further include a connection frame connects the pair of inner convex lenses respectively mounted in the pair of lens housings through the guide slots of the pair of lens housings.

The connection frame may include a pair of inner housings which are positioned inside the pair of lens housings, have the pair of inner convex lenses, and are installed movably inside the pair of lens housings and a connecting rod which connects the pair of inner housings through the guide slots of the pair of lens housings.

Each of the pair of inner housings may include an inner housing body which has a tubular shape, moves along an inside of the outer housing body, and is shorter than the outer housing body and an inner cap which fixes the inner convex lens positioned on a front surface of the inner housing body to the inner housing body.

The outer housing body may have a locking protrusion formed therein which restricts movement of the inner housing body to the outer convex lens.

The locking protrusion may be formed at a position which allows the outer convex lens and the inner convex lens to be spaced apart from each other when the inner housing body is in contact with the locking protrusion.

The inner convex lens may move up to 15 to 30 mm with respect to the outer convex lens.

The driving part may include a motor mount installed between the pair of lens housings, a motor fixed to the motor mount, a drive shaft having one end connected to the motor to transfer a driving force to the connecting rod, thereby moving the pair of outer convex lens, and a shaft bearing supporting the other end of the drive shaft.

The drive shaft may be installed orthogonally to the connecting rod and the connecting rod may move linearly according to rotation of the drive shaft, thereby moving the pair of outer convex lenses.

The driving part may operate in a wireless control manner.

According to the present invention, by using convex lenses as double lenses, a greater distance vision effect is achieved as compared to using a single Newtonian lens, thereby more effectively assisting in relieving eye fatigue.

A structure in which an inner lens moves back and forth in a state in which an outer lens is secured at a fixed position is provided, and hence shift of the center of gravity due to the forward and backward movement of the lens can be minimized.

In addition, weight of parts that move along with forward and backward movement of an inner convex lens can be reduced, so that the forward and backward movement of the lens can be more stably performed. That is, a moving method of the inner convex lens can use a low-power motor as compared to a method of using a single Newtonian lens, and hence it is possible to suppress the generation of vibration or noise caused by driving of the motor.

DETAILED DESCRIPTION

In the following description of the present invention, a detailed description is provided only to assist in gaining a comprehensive understanding of the present invention, and it is apparent to those skilled in the art a detailed description of known functions and configurations incorporated herein will be omitted when it may obscure the subject matter of the present invention.

Here, the technical terms and words used in the specification and claims must not be interpreted according to limited definitions thereof, such as ordinary or dictionary meanings, but must be understood to represent meanings and concepts corresponding to the technical scope and spirit of the invention. Thus, those skilled in the art will appreciate that the construction of the embodiments and drawings of the invention have been disclosed as that of preferred embodiments, and thus various modifications, additions and substitutions are possible, without departing from the scope and spirit of the invention as disclosed in the accompanying claims.

Hereinafter, an exemplary embodiment of the present invention will be described in detail with reference to the accompanying drawings.

Figure 1:
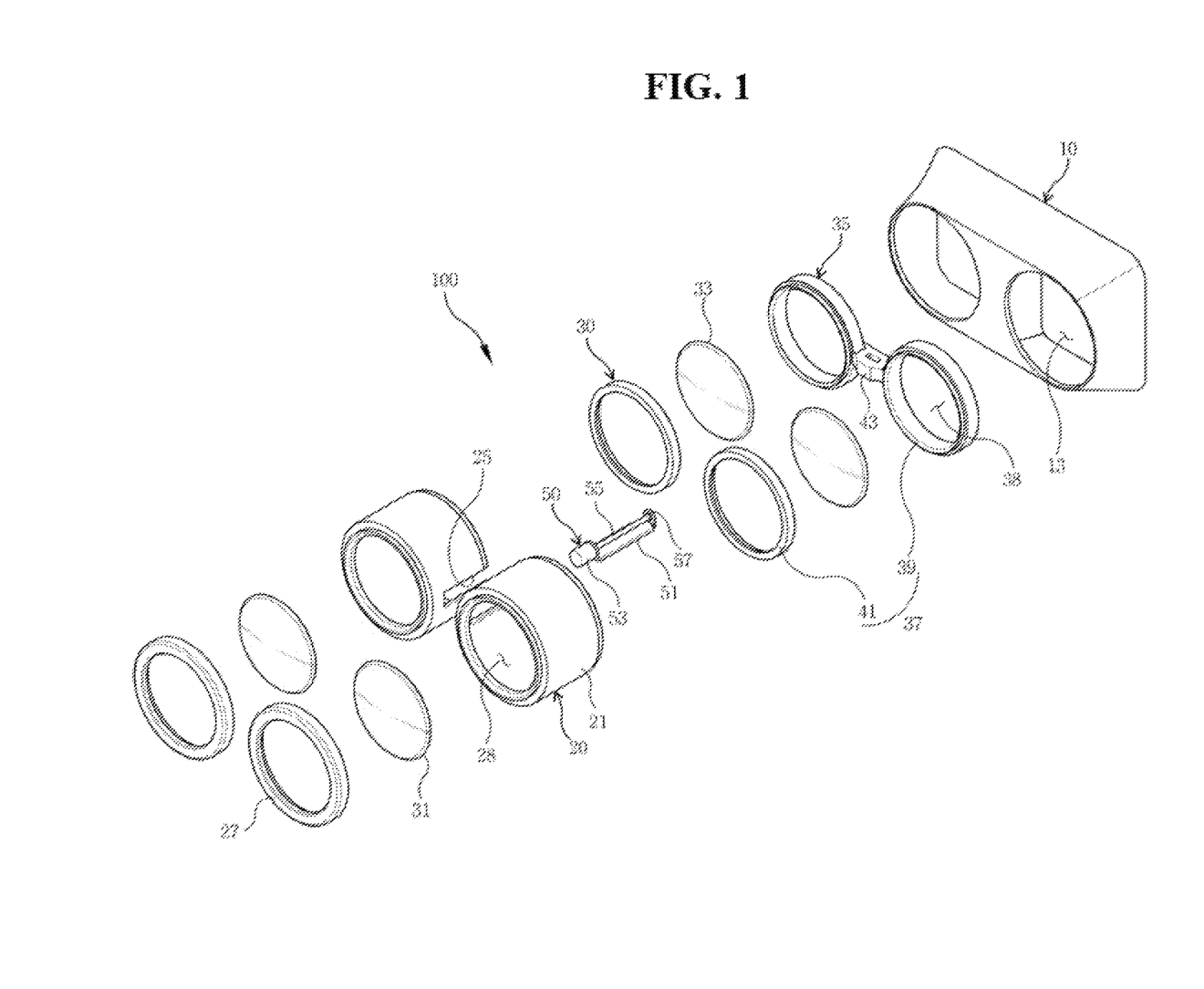
FIG. 1 is an exploded perspective views of a distance vision-realizing eyeglasses for an image device display according to one embodiment of the present invention.
Figure 2:
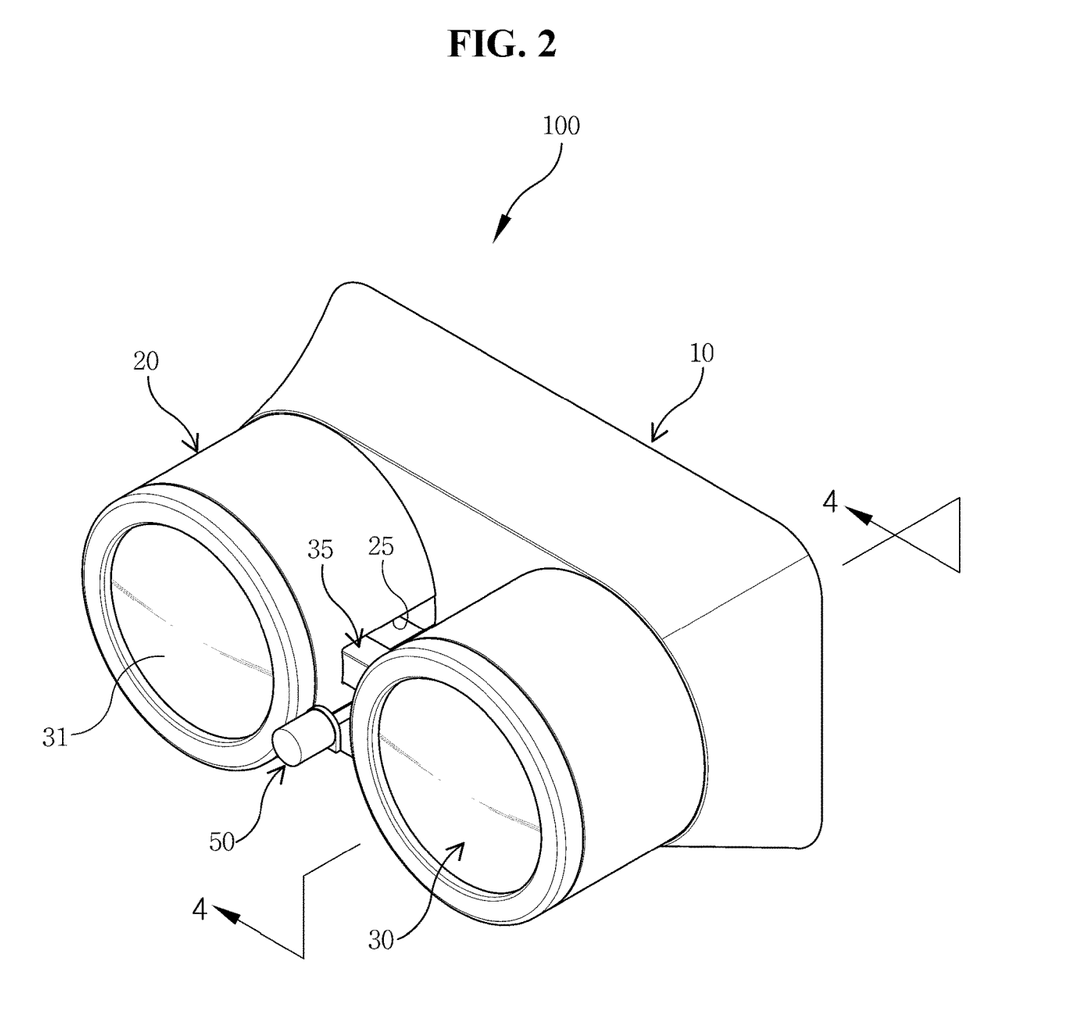
FIG. 2 is a perspective view of the distance vision-realizing eyeglasses for an image display device shown in FIG. 1.
Figure 3:
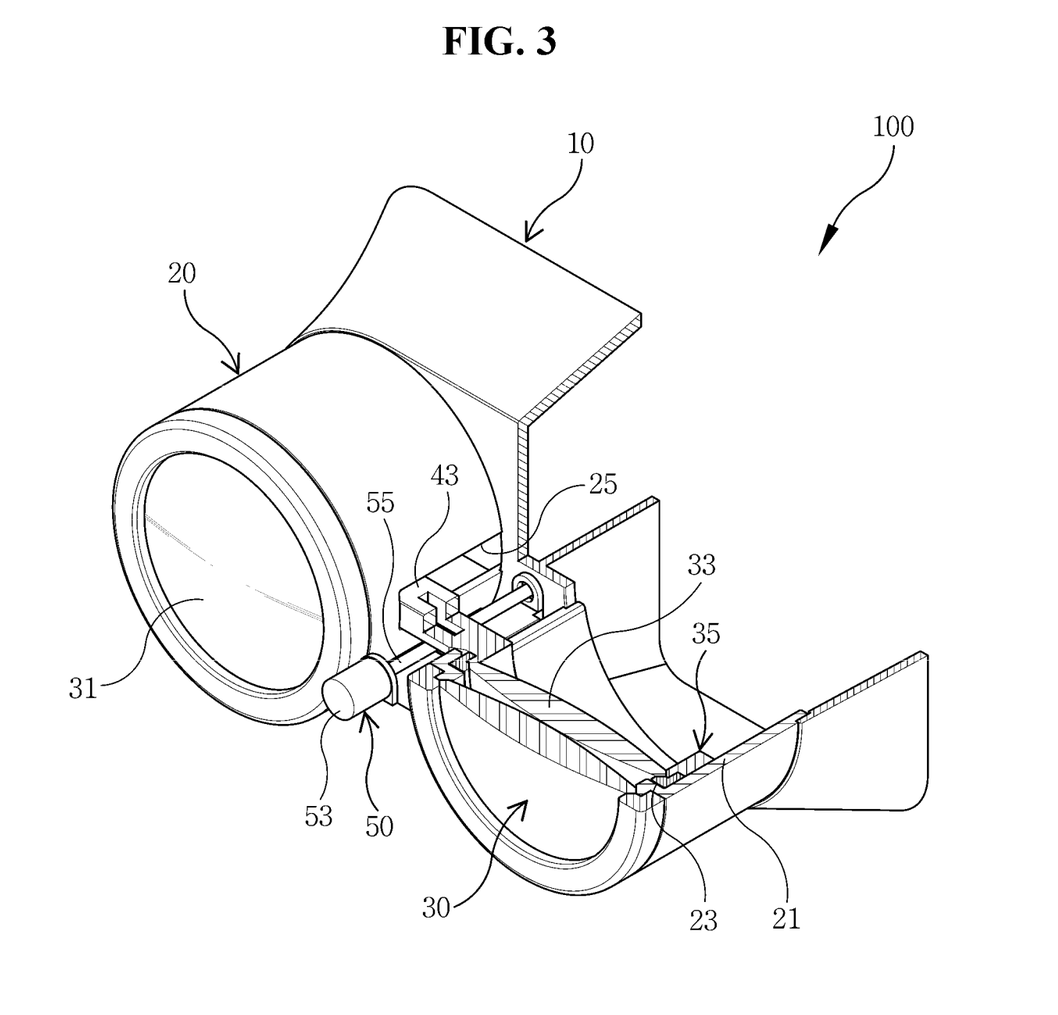
FIG. 3 is a partially exploded perspective view of the distance vision-realizing eyeglasses for an image display device shown in FIG. 1.

FIG. 1 is an exploded perspective views of a distance vision-realizing eyeglasses for an image device display according to one embodiment of the present invention. FIG. 2 is a perspective view of the distance vision-realizing eyeglasses for an image display device shown in FIG. 1. FIG. 3 is a partially exploded perspective view of the distance vision-realizing eyeglasses for an image display device shown in FIG. 1.

Referring to FIGS. 1 to 3, the distance vision-realizing eyeglasses 100 for an image display device according to the present embodiment are a tool assisting in relieving eye fatigue by enabling the realization of distance vision using double convex lenses. The distance vision-realizing eyeglasses 100 for an image display device includes a case 10, a double convex lens assembly including a pair of lens housings 20, and a pair of double convex lenses 31 and 33, and a driving part 50. In this case, the case 10 may surround a region around a pair of eyes of a wearer, and a pair of lens housing mounting holes are formed in front of the case 10. The pair of lens housings 20 are respectively mounted in the pair of lens housing mounting holes 13 of the case 10. The pair of double convex lenses 31 and 33 are respectively provided in the pair of lens housings 20 on the front straight line of both eyes of the wearer. Among the pair of double convex lenses 31 and 33, an outer convex lens 31 positioned on an outer side is fixed to the lens housing 20 and an inner convex lens 33 positioned inside the lens housing 20 is mounted movably forward and backward, thereby enabling realization of distance vision. In addition, the driving part 50 is installed between the pair of lens housings 20 to move the pair of inner convex lenses 33 of the double convex lens assembly 30.

As such, the distance vision-realizing eyeglasses for an image display device according to the present embodiment has a structure in which the inner convex lens 33 moves forward and backward relative to the fixed outer convex lens 31, so that it is possible to reduce the shift of the center of gravity of the distance vision-realizing eyeglasses for an image display device which is due to the forward and backward movement of the inner convex lens 33.

In this case, the distance vision-realizing eyeglasses 100 for an image display device according to the present embodiment is applicable to an image display device, such as a virtual reality (VR) device, a mixed reality (MR) device, or the like.

The distance vision-realizing eyeglasses for an image display device according to the present embodiment will be described below in detail.

The case 10 is a part surrounding a region including both eyes of the wearer and is worn on a face of the wearer. The pair of lens housing mounting holes 13 are formed at positions corresponding to both eyes of the wearer.

Although not illustrated, the case 10 may be provided with a wearing member, such as a band, which can be worn on a head of the wearer. A button may be installed in the case 10 to manipulate the driving part 50. Alternatively, the driving part 50 may be operated in a wireless control manner. As a wireless terminal to drive the driving part 50 in a wireless manner, a dedicated terminal, such as a wireless remote controller, may be used, and in addition, a smartphone, a tablet personal computer (PC), a notebook PC, a PC, and the like may be used. When the driving part 50 is driven in a wireless manner, a button to manipulate the driving part 50 may not be installed in the case 10.

The double convex lens assembly 30 realizes distance vision by forward and backward movement of the inner convex lens that is movably installed inside the lens housing 20 relative to the outer convex lens 31 fixed on an outer side of the lens housing 20.

The pair of lens housings 20 may be respectively mounted in the pair of lens housing mounting holes 13 of the case 10. The pair of lens housings 20 may be mounted detachably to the case 10. The pair of lens housings 20 each may include an outer housing body 21 and an external cap 27. The outer housing body 21 has a tubular shape and includes a guide slot 25 formed on a surface facing the other lens housing 20 along a direction of movement of the inner convex lens 33. The external cap 27 fixes the outer convex lens 31, which is positioned on the front surface of the outer housing body 21, to the outer housing body 21.

In this case, the reason why the outer housing body 21 is formed in a tubular shape is to allow the inner convex lens 33 installed therein to stably move forward and backward. A tubular-shaped hole 28 formed in the outer housing body 21 is formed in alignment with the lens housing mounting hole 13.

The guide slot 25, which will be described below, guides forward and backward movement of a connection frame 35 that connects the pair of inner convex lenses 33 during the forward and backward movement of the pair of inner convex lenses 33. The guide slot 25 may be formed on a center line connecting the pair of outer housing bodies 21.

The outer convex lenses 31 and the inner convex lenses 33 of the pair of double convex lenses 31 and 33 are installed in pairs in each of the paired lens housings 20.

In addition, the connection frame 35 connects the pair of inner convex lenses 33, which are respectively installed in the pair of lens housings 20, through the guide slots 25.

In this case, the inner convex lens 33 is installed inside the lens housing 20 via the connection frame 35 with respect to the outer convex lens 31 fixed to the lens housing 20. The inner convex lens 33 is moved forward and backward inside the lens housing 20 by forward and backward movement of the connection frame 35. The outer convex lens 31 and the inner convex lens 33 are arranged such that the centers of the lenses coincide. A distance between the centers of the pair of double convex lenses 31 and 33 is designed to correspond to a distance between both eyes of the general wearer. For example, the distance between the centers of the pair of double convex lenses 31 and 33 may be 55 mm to 65 mm.

An example in which convex lenses of the same size are used as the outer convex lens 31 and the inner convex lens 33 is disclosed, but convex lenses of different sizes may be used as needed.

The connection frame 35 includes a pair of inner housings 37 and a connecting rod 43. The pair of inner housings 37 are positioned inside the pair of lens housings 20, have the pair of inner convex lenses 33 mounted therein, and are installed movably in the pair of lens housings 20. In addition, the connecting rod 43 connects the pair of inner housings 37 through the guide slots 25 of the pair of lens housings 20. That is, the connection frame 35 has a form of an eyeglasses frame, without eyeglass temples, which surrounds lenses.

Each of the pair of inner housings 37 may include an inner housing body 39 and an inner cap 41. The inner housing body 39 with a tubular shape moves along the inside of the outer housing body 21 and is shorter than the outer housing body 21. A tubular-shaped hole 38 formed in the inner housing body 39 is formed in alignment with the lens housing mounting hole 13.

In addition, the inner cap 41 fixes the inner convex lens 33, which is positioned on the front surface of the inner housing body 39, to the inner housing body 39.

Meanwhile, although an example in which the inner convex lens 33 is fixed to the inner housing body 39 by utilizing the inner cap 41 is disclosed, the present embodiment is not limited thereto. For example, the inner convex lens 33 may be fixed by being directly inserted into the inner housing 37.

The distance vision-realizing eyeglasses 100 for an image display device realizes distance vision by forward and backward movement of the connection frame 35 in which the inner convex lens 33 is mounted, and hence it is possible to reduce the number and weight of parts that move forward and backward when compared to conventional googles equipped with a single Newtonian lens for image display. Accordingly, the forward and backward movement of the inner convex lens 33 may be more stably performed.

A locking protrusion 23 that restricts the movement of the inner convex lens 33 to the outer convex lens 31 of the inner housing body 39 when the inner convex lens 33 moves inside the lens housing 20 is formed in the lensing housing 20. In other words, in order to prevent mechanical collision between the inner convex lens 33 and the outer convex lens 31, the locking protrusion 23 which restricts the movement of the inner convex lens 33 to the outer convex lens 31 of the inner housing body 39 in which the inner convex lens 33 is mounted is formed to be in contact with the inner housing body 39, inside the outer housing body 21 in which the outer convex lens 31 is mounted. The locking protrusion 23 is formed at a position which allows the outer convex lens 31 and the inner convex lens 33 to be close to each other but still be spaced apart from each other when the inner housing body 39 is in contact with the locking protrusion 23.

The double convex lens assembly 30 may move back and forth such that the inner convex lens 33 moves relative to the fixed outer convex lens 31 and a moving distance thereof may be set within a range that does not exceed the maximum distance that the inner housing body 39 having the inner convex lens 33 mounted therein can move to the case 10 in a state of being caught by the locking protrusion 23 of the outer housing body 21. The maximum distance that the inner convex lens 33 can move from the outer convex lens 31 is in proportion to the length of the outer housing body 21. The moving distance of the inner convex lens 33 may be controlled by the length of the guide slot 25. For example, the inner convex lens 33 may be designed to move up to 15 to 30 mm with respect to the outer convex lens 31.

In addition, the driving part 50 moves the connection frame 35 having the pair of inner convex lenses 33 mounted therein back and forth. The driving part 50 may move the connection frame 35 in motor driving manner. That is, the driving part 50 includes a motor mount 51, a motor 53, and a drive shaft 55, and may further include a shaft bearing 57. The motor mount 51 is installed between the pair of lens housings 20. The motor 53 is fixed to the motor mount 51. The drive shaft 55 has one end connected to the motor 53 to transfer a driving force to the connecting rod 43, thereby moving the pair of outer convex lenses 31. In addition, the shaft bearing 57 supports the other end of the drive shaft 55 so that the drive shaft 55 can stably rotate by receiving power from the motor 53.

In this case, the drive shaft 55 is installed orthogonally to the connecting rod 43. The connecting rod 43 moves linearly according to the rotation of the drive shaft 55, thereby moving the pair of outer convex lenses 31 back and forth. That is, by the rotation of the drive shaft 55, the connecting rod 43 engaged with the drive shaft 55 moves back and forth along a direction in which the drive shaft 55 is installed.

Meanwhile, although the driving part 50 in accordance with the present embodiment is illustrated as being exposed to the outside, the driving part 50 may be covered with a cover and thus be blocked from the outside.

Meanwhile, although the driving part 50 in accordance with the present embodiment is illustrated as operating in a motor driving manner, the present embodiment is not limited thereto. For example, the driving part 50 may operate in a cylinder driving manner. In the case of a cylinder driving method, a cylinder and a cylinder rod are provided instead of the motor 53 and the drive shaft 55.

Figure 4:
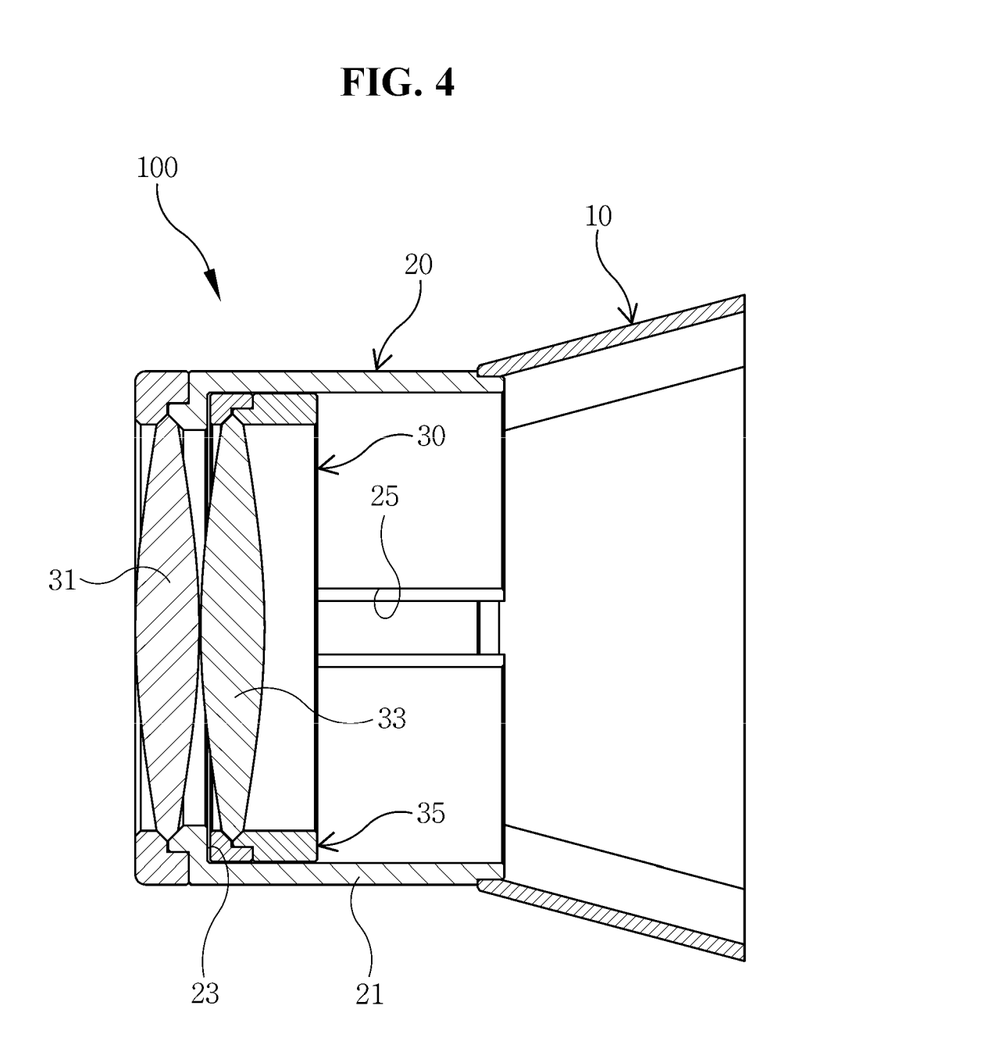
FIG. 4 is a cross-sectional view taken along the line 4-4 of FIG. 2.
Figure 5:
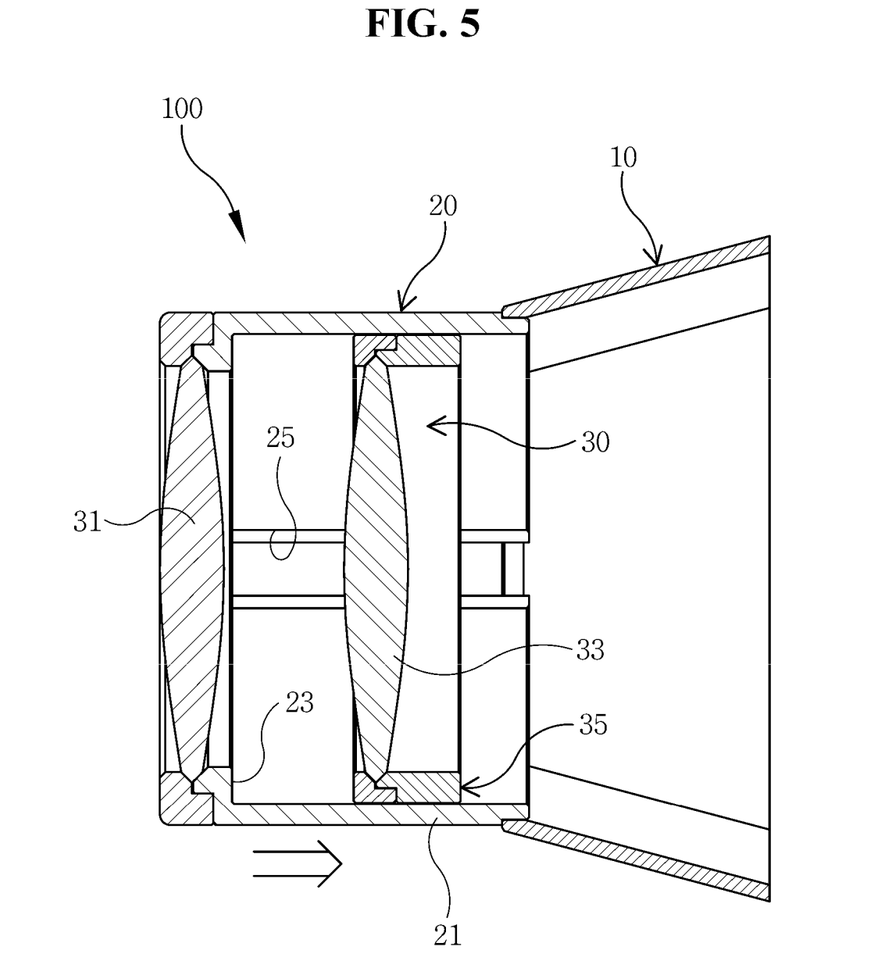
FIG. 5 is a cross-sectional view showing a state in which an inner lens of FIG. 4 is moved relative to an outer lens.

A driving method of the distance vision-realizing eyeglasses for an image display device in accordance with the present embodiment as described above will be described below with reference to FIGS. 4 and 5. Here, FIG. 4 is a cross-sectional view taken along the line 4-4 of FIG. 2. FIG. 5 is a cross-sectional view showing a state in which an inner lens of FIG. 4 is moved relative to an outer lens.

As shown in FIGS. 4 and 5, the distance vision-realizing eyeglasses 100 for an image display device according to the present embodiment may assist in relieving eye fatigue by enabling the realization of distance vision using double convex lenses. That is, distance vision may be adjusted according to a distance to move the inner convex lens 33 toward an eye of the wearer with respect to the outer convex lens 31.

For example, a distance vision effect is compared between when letter "A" is viewed with the conventional goggles equipped with a single Newtonian lens for image display and when the same letter is viewed with the distance vision-realizing eyeglasses 100 for an image display device in accordance with the present embodiment. In this case, a vertical length of the letter "A" is 15 mm. A distance between the wearer and the letter is 60 mm. The letter is enlarged to about 35 mm when viewed without wearing the conventional goggles and the distance vision-realizing eyeglasses 100 for an image display device according to the present embodiment.

After wearing the conventional googles and the distance vision-realizing eyeglasses 100 for an image display device according to the present embodiment, a single Newtonian lens and the inner convex lens 33 are moved 15 mm forward from the eye to view from a distance. At this time, in the case of the single Newtonian lens, the corresponding letter being viewed is reduced to 30 mm. On the other hand, in the case of the double convex lenses, the same letter being viewed is reduced to 27 mm.

This indicates that even with the same degree of refraction, the double convex lens has a superior distance vision effect to the single Newtonian lens.

In addition, when the single Newtonian lens is moved 15 mm forward from the eye in an effort to achieve a distance vision effect, approximately 80 g of weight shift is detected. On the other hand, in the distance vision-realizing eyeglasses 100 for an image display device according to the present embodiment, approximately 30 g of weight shift is detected due to the movement of the inner convex lens 33.

That is, due to the structure in which the inner convex lens 33 moves back and forth in a state in which the outer convex lens 31 is secured in a fixed position, it is possible to minimize the shift of the center of gravity caused by the forward and backward movement of the lens. On the contrary, in the conventional goggles, the single Newtonian lens is positioned on an outer side of the goggles and thus the shift of the center of gravity caused by the forward and backward movement of the single Newtonian lens occurs more significantly than the distance vision-realizing eyeglasses 100 for an image display device according to the present embodiment.

Because the weight shift due to the movement of the inner convex lens 33 is small in the distance vision-realizing eyeglasses for an image display device according to the present embodiment, the motor 53 required to move the inner convex lens 33 may be a motor with a lower axial force compared to a motor used in the conventional goggles.

In addition, since the weight of parts that move along the forward and backward movement of the inner convex lens 33 can be reduced, the forward and backward movement of the lens is stably performed. That is, since the movement method of the inner convex lens 33 can use a lower power motor 53 than the method of using a single Newtonian lens, it is possible to suppress the generation of vibration or noise caused by driving of the motor 53.

It would be understood by those skilled in the art that the above-described embodiments are illustrative in all aspects and do not limit the present invention. It will be apparent to those skilled in the art that various modifications or alterations can be contrived and implemented within the scope described in the specification, and these modifications and alterations also fall within the technical scope of the present invention.

The invention claimed is:

1. Distance vision-realizing eyeglasses for an image display device for relieving eye fatigue, the distance vision-realizing eyeglasses comprising:
   a case which surrounds a region of both eyes of a wearer of the eyeglasses and has a pair of lens housing mounting holes formed in front thereof and an opening portion formed at a rear thereof which is in contact with the region of both eyes and a face surface, and which has a predetermined width of a space between the opening portion and the holes;
   a pair of lens housings which are respectively mounted in front of the pair of lens housing mounting holes of the case;
   a pair of double convex lenses which are respectively provided in the pair of lens housings on a front straight line of both eyes of the wearer;
   an outer convex lens pair which is positioned on an outer side among the pair of the double convex lenses and is fixed to the lens housing;
   an inner convex lens pair which is positioned inside the lens housing and is mounted movably forward and backward;
   a double convex lens assembly which is formed by including the lens housings, double convex lenses, the outer convex lens pair, and the inner convex lens pair and enables realization of distance vision;
   a driving part which is installed between the pair of lens housings and moves a pair of inner convex lenses of the double convex lens assembly; and
   an outer housing body which is included in each of the pair of lens housings, has a tubular shape, and includes a guide slot formed on a side facing the other lens housing in the pair of the lens housings to guide the inner convex lens to a movement direction during movement of the inner convex lens, wherein the outer convex lens pair and the inner convex lens pair are arranged such that centers of the lenses coincide.

2. The distance vision-realizing eyeglasses of claim 1, wherein each of the pair of lens housings includes an outer cap which fixes the outer convex lens position on a front surface of the outer housing body to the outer housing body.

3. The distance vision-realizing eyeglasses of claim 2, wherein the guide slot is formed on a center line that connects centers of a pair of outer housing bodies.

4. The distance vision-realizing eyeglasses of claim 2, wherein the double convex lens assembly further includes a connection frame connects the pair of inner convex lenses respectively mounted in the pair of lens housings through the guide slots of the pair of lens housings.

5. The distance vision-realizing eyeglasses of claim 4, wherein the connection frame includes a pair of inner housings which are positioned inside the pair of lens housings, have the pair of inner convex lenses, and are installed movably inside the pair of lens housings and a connecting rod which connects the pair of inner housings through the guide slots of the pair of lens housings.

6. The distance vision-realizing eyeglasses of claim 5, wherein each of the pair of inner housings includes an inner housing body which has a tubular shape, moves along an inside of the outer housing body, and is shorter than the outer housing body and an inner cap which fixes the inner convex lens positioned on a front surface of the inner housing body to the inner housing body.

7. The distance vision-realizing eyeglasses of claim 6, wherein the outer housing body includes a locking protrusion formed therein which restricts movement of the inner housing body to the outer convex lens.

8. The distance vision-realizing eyeglasses of claim 7, wherein the locking protrusion is formed at a position which allows the outer convex lens and the inner convex lens to be spaced apart from each other when the inner housing body is in contact with the locking protrusion.

9. The distance vision-realizing eyeglasses of claim 8, wherein the inner convex lens moves up to 15 to 30 mm with respect to the outer convex lens.

10. The distance vision-realizing eyeglasses of claim 5, wherein the driving part includes a motor mount installed between the pair of lens housings, a motor fixed to the motor mount, a drive shaft having one end connected to the motor to transfer a driving force to the connecting rod, thereby moving the pair of outer convex lens, and a shaft bearing supporting the other end of the drive shaft.

11. The distance vision-realizing eyeglasses of claim 10, wherein the drive shaft is installed orthogonally to the connecting rod and the connecting rod moves linearly according to rotation of the drive shaft, thereby moving the pair of outer convex lenses.

12. The distance vision-realizing eyeglasses of claim 11, wherein the driving part operates in a wireless control manner.

\* \* \* \* \*